Figure 1:
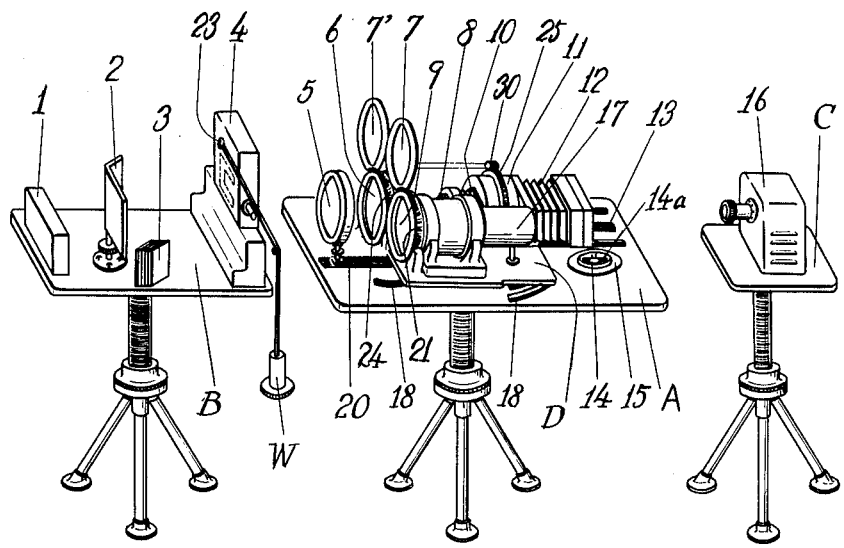

Nov. 23, 1965 TADASHI MINOURA ETAL 3,218,912
POLARISCOPE FOR TAKING AND PRINTING PHOTOGRAPHS
OF STRESS TRAJECTORIES AND SHEAR FLOW
Filed April 18, 1960 2 Sheets-Sheet 1

INVENTORS
TADASHI MINOURA,
TOKUSABURO KOMAI
BY
Wenderoth, Lind & Ponack
Att'ys.

Nov. 23, 1965 TADASHI MINOURA ETAL 3,218,912
POLARISCOPE FOR TAKING AND PRINTING PHOTOGRAPHS
OF STRESS TRAJECTORIES AND SHEAR FLOW
Filed April 18, 1960 2 Sheets-Sheet 2

INVENTOR.
TADASHI MINOURA
TOKUSABURO KOMAI
BY
Wenderoth, Lind & Ponack
Attys.

United States Patent Office 3,218,912
Patented Nov. 23, 1965

3,218,912
POLARISCOPE FOR TAKING AND PRINTING PHOTOGRAPHS OF STRESS TRAJECTORIES AND SHEAR FLOW
Tadashi Minoura, 31 Oaza-Fushimido, Tondabayashi, Japan, and Tokusaburo Komai, 247 Oaza-Takada, Yamatotakada, Japan
Filed Apr. 18, 1960, Ser. No. 22,787
3 Claims. (Cl. 88—14)

This invention relates to an entirely new type of polariscope designed to make possible the photo-elastic determination of durability, stability and strength of houses, frames of bridges, cars, ships, atomic piles and bodies under a dynamic load, e.g., jet-planes and rockets.

In the known types of polariscopes, camera mechanisms for taking a photograph of the force-direction image are not present, and therefore manual operations and sketching for production of force-direction lines such as stress-trajectories and shear-flows are needed, which manual operations often result in incorrect sketches and take a long time.

It is therefore the object of this invention to eliminate said manual operations and provide immediately the correct photographs of the images through the medium of a suitable camera mechanism without any troubles.

To achieve this object, this invention consists of three tables adjustable relative to each other, which are arranged in a line. On the center table, a camera mechanism, a polarizer, a light source, an analyzer, and a condenser are provided at an adequate distance and adapted to be movable relative to each other. A specimen in a loading device, a double-mirror, a supporter for printing paper and a container are arranged at appropriate positions on another table which is adjacent to said condenser and a polarizer. On the last table, a light source is placed which is used for photoprinting and which can move with the table. Said camera mechanism comprises a main body of a camera, bellows and a rotating drum, in which drum there are a reflecting plate and reflecting mirror which are adjustable.

By the above-mentioned mechanism, a parallel light from the light source is caused to travel through the polarizer, be reflected by the double-mirror, through the specimen, the condenser, the analyzer and the camera lens, and finally inside the bellows. Thus, the image is obtained on a focus plane and can be observed. In this case, the multi-images corresponding to the several parts of the specimen, or the individual image can be obtained on a film. If desired, printing is performed on the photosensitive printing, which is substituted for the specimen, by using the light source and sending light through the images on the film in the bellows, thence through the lens and the condenser.

The mechanism of this invention has various advantages which make it possible to produce automatically the multi-imaged film or the respectively imaged film, by the suitable camera mechanism, in comparison with the conventional polariscopes in which the sketching is performed from observation by the eyes of the sketcher and manual operations. In addition the printing of the images is effected on the photosensitive paper by an easy process under this invention.

Figure 2:
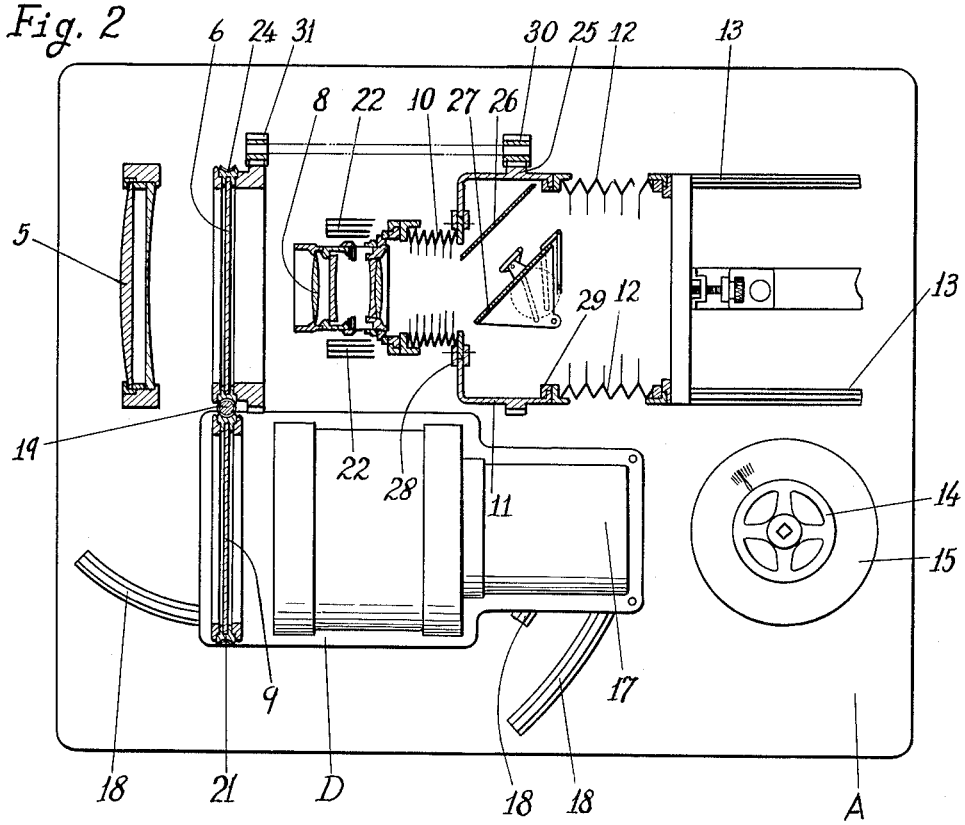
Figure 3:
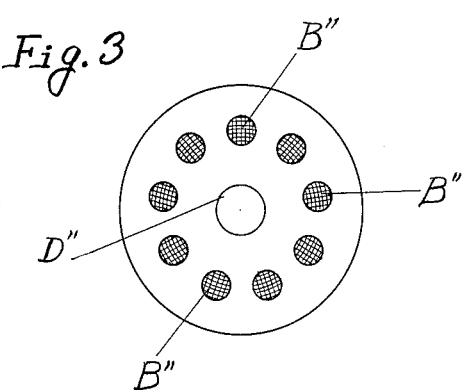

For a more complete understanding of this invention, reference may be had to the following description and accompanying drawings, in which:

FIG. 1 is a perspective of the complete polariscope.
FIG. 2 is a plan view of the main body, partly in section.
FIG. 3 is a view of a diagram produced by the apparatus.
FIG. 1 illustrates the complete arrangement. A, B and C are tables which are movable relative to each other. On the plate D are mounted a polarizer 9 and a cold light source 17 with a field lens.

The plate D with the polarizer 9 and the light source 17 smoothly pivots around a worm 19 along the rails 18 (the pivoting movement being performed by hand or automatically), to whatever angle may be desired. A worm-wheel 21 (see FIG. 2) is attached around the frame of the polarizer 9 and meshes with the worm 19. The polarizer 9 is adjustable through a small angle, though it is not shown in the figures. On the table A, rails 13 are arranged parallel to the plate D. On the rails 13, a main body of camera 12 is slidably mounted for movement back and forth. A rotating drum 11 is supported in front of the main body, on which a camera lens 8 is carried on the rails 22 (see FIG. 2) to make it possible to move the lens 8 back and forth freely so as to adjust it. In front of the camera lens 8, an analyzer 6 is placed. A worm-wheel 24 (see FIG. 2) is arranged around the frame of the analyzer 6 and is meshed with the worm 19. In front of the analyzer 6 a condenser 5 is slidably mounted on the rails 20 to make it possible to move it back and forth. A handle 14 with a compass-needle 14a is arranged on a part (or a side) of table A and has a scale 15 to measure the rotating angle. The handle can, by means not shown, rotate the polarizer 9, the analyzer 6 and the rotating drum 11 through the same angle. On the table B, a loading device 4 is arranged on the side toward the table A. Any specimen 23 in the loading device can be loaded by a weight W which is adjustable as desired, and the specimen is placed opposite the camera lens 8 and the analyzer 6 on the table A. In the rear of the loading device 4, a double-mirror 2 is arranged. The double-mirror reflects light from the polarizer 9 to the camera lens 8 through the specimen 23 and the analyzer 6.

A supporter 3 for photosenstive paper can be provided on the table B. On the table C, a light source 16 is placed for use in printing and can move with the table. The above-mentioned tables A, B and C are separately arranged, but sometimes can be combined into a single table having parts movable relative to each other.

As shown in FIGURE 2, the rotating drum 11 is positioned between the main body of camera 12 and the bellows 10, both of which are rotatably connected to the drum 11 by rings 28 and 29 respectively. A gear 25 is attached around the main body and meshes with a pinion 30, and pinion 30 is connected by a shaft to coaxial pinion 31, so that the drum 11, polarizer 9, and the analyzer 6 are simultaneously rotated through the same angle. Inside the rotating drum 11 are mounted a reflecting plate 26 and reflecting mirror 27. Mirror 27 is movable into and out of the axial position in the camera by a linkage. In the case as shown in the figure, the photographs of isoclinics can be obtained on outer part of film, when mirror 27 is moved aside the photograph of isochromatics can be obtained in the center. Quadrants (one-fourth wavelength plates) 7 and 7' are pivoted respectively to frames of polarizer 9 and analyzer 6, and cover them when desired. Thus parallel light from the source 17 travels through the polarizer 9, is reflected by the double-mirror 2, passes through the condenser 5, and analyzer 6 and the camera lens 8, and finally inside the bellows. Thus the image is obtained on a focus plane and can be observed or recorded on a negative film.

Rotation of the polarizer 9 and the analyzer 6 by the worm 19 changes the angle of the drum 11 (therefore the positions of the reflecting plate 26 and the reflecting mirror 27), and thus negative photographs of isoclinics corresponding respectively to the clinic angles, e.g., 9°, 18°, 27° . . . 81°, can be obtained. In order to get the positive prints of stress-trajectories and shear-flows, the above-obtained negative film of isoclinics is put on a checkers plate in the focus plane and is illuminated by the source 16, and the image focused on the photosensitive paper from supporter 3, which has been positioned to table B in place of specimen 23, is printed repeatedly by rotating the drum through the angle corresponding to each clinic angle. In other words, printing is performed by using the source 16, putting the printing paper in the place of the specimen 23 and sending light through the isoclinics negative film and checkers plate in the bellows, thence through the lens 8 and the condenser 5. Thus by rotating of the drum 11, the images of isoclinics corresponding to the several clinic angles are printed on the same paper. The method of discriminating the images is shown in FIG. 3, in which mark D″ is the photograph of the isochromatics and B″ is that of isoclinics.

The above described mechanism can have many applications such as in—

(1) Polariscope: parallel light type, for two-dimensional analysis.
(2) Polariscope: stress freezing type, for three-dimensional analysis.
(3) Polariscope: for test on surface of prototype itself.
(4) Polariscope: reflecting type, for study photoplasticity.
(5) Equipment for photographing of stress-trajectories.
(6) Equipment for photographing of shear-flows.

The durablity, stability and strength of any structure can, therefore, be easily tested by this polariscope and the body may be constructed in a smaller size.

We claim:

1. A polariscope for obtaining stress trajectories and shear flows, comprising a first table having a source of light thereon, a rotatable polarizer in front of said light source, said light source and polarizer being on a first optical axis, a condenser, a rotatable analyzer, and a rotatable camera on said first table along a second optical axis, said camera having internal reflecting means therein for internally reflecting an image to an axis parallel to said second optical axis, means on said table connected to said polarizer, analyzer and camera for simultaneously rotating them, a second table positioned in front of said source of light and having a double mirror thereon for receiving incident light from along said first axis from said source and redirecting the light along said second optical axis of said condenser, analyzer and camera, a loading device for a specimen on said second table between said double mirror and said condenser, and a third table positioned behind said first table and having a photographic printing light thereon on said optical axis.

2. A polariscope as claimed in claim 1 in which said polarizer and analyzer are immediately adjacent each other and each has a worm gear around the periphery thereof, a worm between said worm gears and engaging each worm gear, said means for rotating said polarizer and analyzer being connected to said worm, and ring gears on said analyzer and said rotatable camera, and a gearing connection between said ring gears.

3. A polariscope as claimed in claim 2 in which said camera comprises a main body having an objective therein, a bellows, said main body and bellows being movable only longitudinally along the optical axis, and a drum rotatably mounted between said main body and said bellows and having one of said ring gears thereon, and said internal reflecting means comprise a parallel reflecting plate member and mirror member in said drum, one of said members being on the axis of rotation of said drum and receiving an image from the camera objective, and the other member being radially spaced from said one member.

References Cited by the Examiner

UNITED STATES PATENTS

| | | | |
|---|---|---|---|
| 2,096,964 | 10/1937 | Frocht | 88—14 |
| 2,730,007 | 1/1956 | Chapman | 88—14 |
| 2,909,958 | 10/1959 | Hildebrand | 88—1 |

FOREIGN PATENTS 946,695  12/1948  France.

OTHER REFERENCES

Kolsky: "II–A Photo-Elastic Investigation of the Hardness of Plastic and Glass," Journal of the Society of Glass Technology, vol. 36, issue No. 168, February 1952, pp. 56, 57, and 58.

Professor Coker's Photo-Elastic Apparatus for Determining the Distribution of Stress in Structural and Machine Members, a catalog of Adam Hilger, Ltd., London, England, dated May 1931, pp. 4, 14, and 22.

JEWELL H. PEDERSEN, *Primary Examiner.*

EMIL G. ANDERSON, *Examiner.*